United States Patent [19]

Campbell

[11] Patent Number: 4,630,755
[45] Date of Patent: Dec. 23, 1986

[54] APPARATUS FOR PRECISELY DISPENSING FREE FLOWING SOLIDS
[75] Inventor: Jeptha E. Campbell, Cincinnati, Ohio
[73] Assignee: Spiral Systems, Inc., Cincinnati, Ohio
[21] Appl. No.: 680,496
[22] Filed: Dec. 11, 1984
[51] Int. Cl.[4] .......................... B67D 5/14; B67D 5/64
[52] U.S. Cl. ..................................... 222/56; 222/161; 222/196; 222/164; 177/64
[58] Field of Search ............... 222/161, 196, 198, 164, 222/166, 55, 56; 177/64, 66, 71, 105, 114; 285/226

[56] References Cited

U.S. PATENT DOCUMENTS

| | | | |
|---|---|---|---|
| 461,997 | 10/1891 | Choen | 285/226 X |
| 2,323,864 | 7/1943 | Weyandt | 222/161 X |
| 3,308,898 | 4/1967 | Allen et al. | 177/64 |
| 3,558,009 | 1/1971 | Carter | 222/161 X |
| 4,320,855 | 4/1982 | Ricciardi et al. | 222/56 |
| 4,382,527 | 5/1983 | Lerner | 222/56 |
| 4,583,660 | 4/1986 | LaBarre et al. | 222/161 X |

*Primary Examiner*—H. Grant Skaggs
*Assistant Examiner*—Jay I. Alexander
*Attorney, Agent, or Firm*—Antonelli, Terry & Wands

[57] ABSTRACT

An apparatus for precisely dispensing free flowing particulate solids with a controllable variable flow rate is disclosed. The invention includes a container for holding a free flowing solid to be dispensed which is pivotable through an angular range of inclination, a transporting mechanism connected to the container, which includes two segments intersecting to define an angle, for transporting particles from the container to a discharge end. The angle causes the particles disposed within the conduit to form a bridge for stopping the flow of particles when the container is inclined at an angle less than the angle at which gravity causes free flow of the powder through the conduit. A vibrator selectively applies vibrations to the particles with an energy level sufficient to cause the bridge to break apart to cause the particles to be free flowing from the container through the transporting mechanism in response to the application of the vibrations. A mechanism for varying the angle of inclination of the container is preferrably used to adjust the rate of flow of the particles through the transporting mechanism as a function of angle during the application of vibrations to the particles.

21 Claims, 10 Drawing Figures

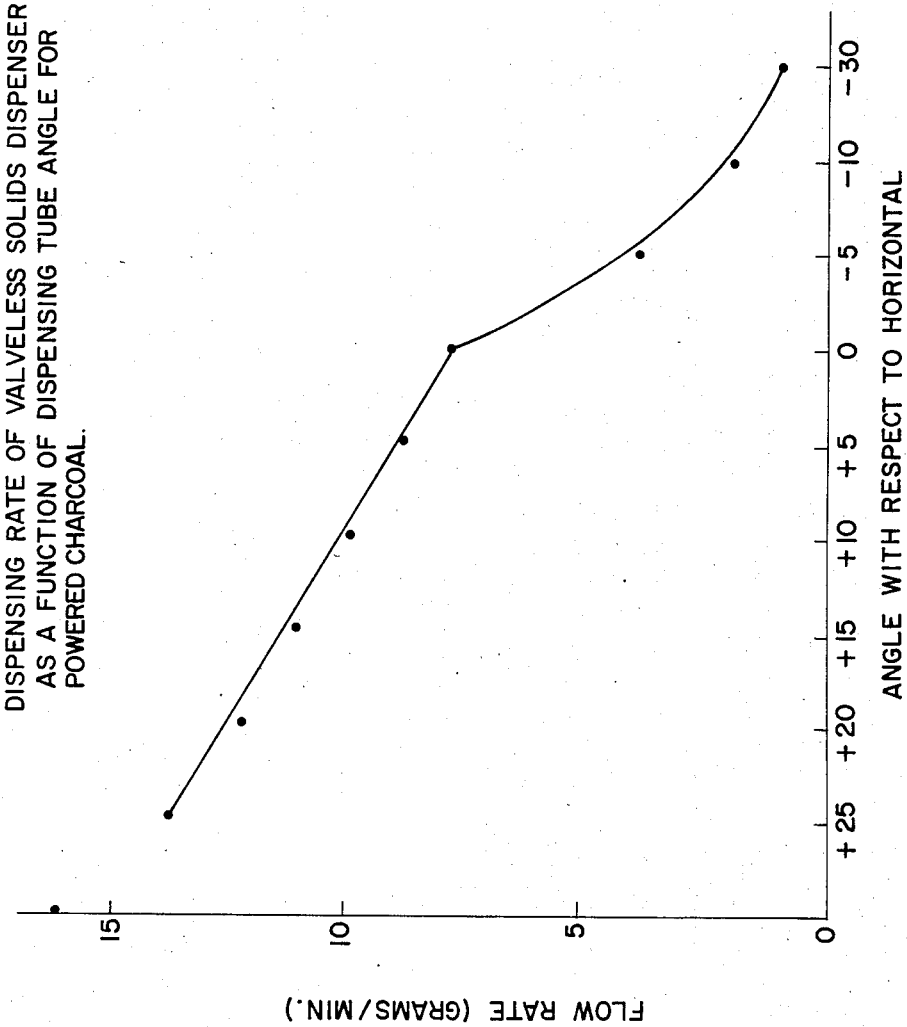

APPARATUS FOR PRECISELY DISPENSING FREE FLOWING SOLIDS

BACKGROUND OF THE INVENTION

1. Field of the Invention

The present invention relates to apparatus for dispensing free flowing solids in precisely metered quantities.

2. Description of the Prior Art

It has been known that particulate solids may be emptied from a container by inclining the container to a vertical orientation at which the particles break loose and flow under the influence of gravity. Flowing of the solid continues until the vertical angle of inclination is reduced to a point at which frictional forces between the individual particles within the free flowing solid cause the particles to bridge together. The problem with dispensing free flowing solids with the aforementioned method is that it is impossible to precisely meter the flow rate once the individual particles have started to flow. Moreover, it is difficult to stop the flow of solids precisely after a predetermined or desired weight of solid has been dispensed from the container.

Systems are also known for dispensing particulate solids from conical-shaped hoppers under the application of an agitating force with sufficient energy to cause the free flow of the solid out of the bottom of a conical hopper. Systems of this type are disclosed in U.S. Pat. Nos. 3,178,068, 3,232,492, 3,270,463, 3,278,081, 3,785,529 and 3,791,558. None of the systems disclosed in the aforementioned patents provides a mechanically simple system for precisely metering the flow rate of particulate solids.

U.S. Pat. No. 3,865,278 discloses a laboratory feeding device for particulate material. A vertically disposed tube is connected to a container of particulate material by means of a coupling at which a screen is located through which the particulate material falls into a feeding trough which moves the material to a discharge end thereof under the influence of applied vibrations.

Solution preparing devices are disclosed in U.S. Pat. Nos. 4,345,628, 4,350,186 and 4,469,146, which meter the weight of a dispensed liquid to be used in preparing a desired type of solution. A total weight of the desired solution including the liquid to be dispensed is calculated. The dispensing of the liquid is stopped when the actual weight of the solution equals the calculated weight. The rate of dispensing of the liquid is reduced when the actual weight approaches the desired weight to facilitate the stopping of dispensing at precisely the calculated weight.

SUMMARY OF THE INVENTION

The present invention is an apparatus for dispensing free flowing solids which has few moving parts and the ability to precisely control flow of the solid from a container to permit programmed dispensing in precisely weighted, programmed amounts. While the invention is not limited to any particular field of application, it is particularly useful for the dispensing of free flowing solids in small amounts typical of those required for work in scientific laboratories.

Without being limited thereto, particulate substances which have an "angle of repose" of approximately 40° or less are sufficiently free flowing to be precisely dispensed by the invention while substances having an angle of repose substantially greater than 40° have been typically found to be not sufficiently free flowing to be precisely dispensed with the invention.

The characteristics of free flowing solids which may be dispensed with the invention are that the particles of the solid (1) bridge together without the application of vibratory energy being applied thereto form a bridge which functions as a shutoff valve in an inclined bent section of a powder transporting device connecting the source of the particulate material to its discharge point and (2) the blockage dissipates under the application of vibratory energy to cause the materials to become free flowing under the influence of the vibrations and the gravitational force applied to the particles within the container to which the transporting device is connected to cause flow from the container through the transporting device.

An apparatus for dispensing free flowing particulate solids in accordance with the invention includes a container for holding a free flowing solid to be dispensed, a transporting mechanism including a passage defined by a continuous closed surface connected to the container for transporting particles of the free flowing solid through the passage, the passage having an inlet connected to the container and a discharge end located remote from the container, the passage defining an angle greater than 90° but less than 180°, the angle causing the particles disposed within the passage to form a bridge which functions to stop the flow of particles through the passage under the influence of gravity when the transporting mechanism is vertically inclined at an angle less than an angle at which gravity causes free flow of particles through the passage, a vibrator for selectively applying vibrations to the particles with an energy sufficient to cause the bridge to break apart to cause the particles to be free flowing from the container under the application of the vibrations and gravity, and a mechanism for varying the angle of inclination of the transporting mechanism to cause variation in the rate of flow of the particles through the passage as a function of angle during the application of vibrations to the particle.

In accordance with the invention, the angle of inclination of the transporting mechanism may be varied by either pivoting the angle of inclination of the container or varying the angle of the intersection of the segments which are connected together by a flexible coupling device.

Further in accordance with the preferred embodiment of the invention, the vibrator for selectively applying vibrations is connected to the transporting mechanism in contact with a segment which has the discharge end. The transporting mechanism is preferably a conduit.

The vibrator for selectively applying vibrations has a stroke of oscillation which is adjustable to vary the energy level applied to the particles to facilitate the breakup of the blockage and to further increase the rate of flow by adding additional energy to the particles in addition to that provided by gravity.

A significant advantage of the present invention is that the rate of flow through the transporting mechanism is a linear function of the vertical angle of inclination of the transporting mechanism for angles when a segment of the transporting mechanism is inclined from the bend or curve in the transporting mechanism which causes bridging to the discharge end with a downward slope. The linear relationship of flow rate as a function of the vertical angle of inclination permits the precise metering of the flow rate by adjustment of the angle of inclination of the transporting mechanism. The precise metering of flow rate is especially important in applications wherein it is necessary to deliver a total net weight of powder as quickly as possible. With the invention, a high vertical inclination of the transporting mechanism may be used to rapidly deliver free flowing solids until the net amount to be delivered closely approaches the desired total net weight at which time the vertical angle of inclination is rotated toward the horizontal to reduce the flow rate as a linear function of the angle of inclination. Thus, the flow rate of solids from the container through the transporting mechanism may be precisely metered at different flow rates as a direct function of the angle of inclination of the transporting mechanism. Precise metering of flow rate is especially useful in laboratory applications where delivery of precisely weighed quantities is critical.

Further in accordance with the invention, the rate of flow of free flowing solids is a non-linear function of the vertical angle of inclination of the transporting mechanism when a segment of the transporting mechanism is inclined from the discharge end to the bend or curve of the transporting mechanism which causes bridging.

The preferred embodiment of the invention, includes a pivoted member, having an axis of rotation at a pivot point, which is connected to the container at a point remote from the pivot point, a base to which the pivoted member is attached at the pivot point, a rotatable member mounted on the base with an axis of rotation parallel to the axis of rotation of the pivoted member, and an arm rotatably connected to the pivoted member at a point remote from the pivot point of the pivoted member and to the rotatable member at the point remote from the axis of rotation of the rotatable member so that rotation of the rotatable member causes pivoting of the container through a vertical angular range of inclination to vary the flow rate of free flowing solids within the transporating mechanism when the vibrator is operating.

The present invention has advantages not realized by the prior art. The stopping of free flow of the solid being dispensed by the deactivation of the vibrator is accomplished without a valve which increases reliability and simplifies cleanup. The adjustment of the flow rate by variation of the angular orientation of the powder transporting mechanism with respect to the vertical provides a reliable and simple mechanism for precisely metering flow rate which is highly useful in applications requiring the dispensing of a precise weight of the free flowing solid. The usage of a small number of moving parts, none of which is contacted with the solid to be dispensed, minimizes the need for repair.

BRIEF DESCRIPTION OF THE DRAWINGS

FIG. 8 illustrates graphically the relationship of the flow rate as a function of the angle of inclination of the transporting mechanism.

DESCRIPTION OF THE PREFERRED EMBODIMENT

The present invention is an apparatus for precisely dispensing free flowing particulate solids. The preferred method of determining if a particulate substance is free flowing is by measurement of the angle of repose A of FIG. 1a. Particulate substances which have an angle of repose substantially greater than 40° typically do not have flow characteristics which permit dispensing with the invention because of the formation of bridging between the particles which is not readily broken apart under the influence of vibrations and gravity in the transporting mechanism discussed, infra, in conjunction with FIG. 1. The angle of repose is determined by pouring the particulate substance whose angle of repose is being measured into a pile as illustrated. Measurement of angle A may be made by any known method. Without limitation, examples of free flowing substances with an angle of repose less than 40° are salt 30°, dry sand 30°, granulated agar 31°, granulated sugar 32° and charcoal 37°. However, as used in the specification and claims the terminology free flowing solid is used to describe those particulate substances which readily flow through a transporting mechanism having two sections intersecting at an angle or alternatively having a curved section under the combined influence of vibrations and gravity but which bridge together to stop flow when no vibrations are applied.

Figure 1:
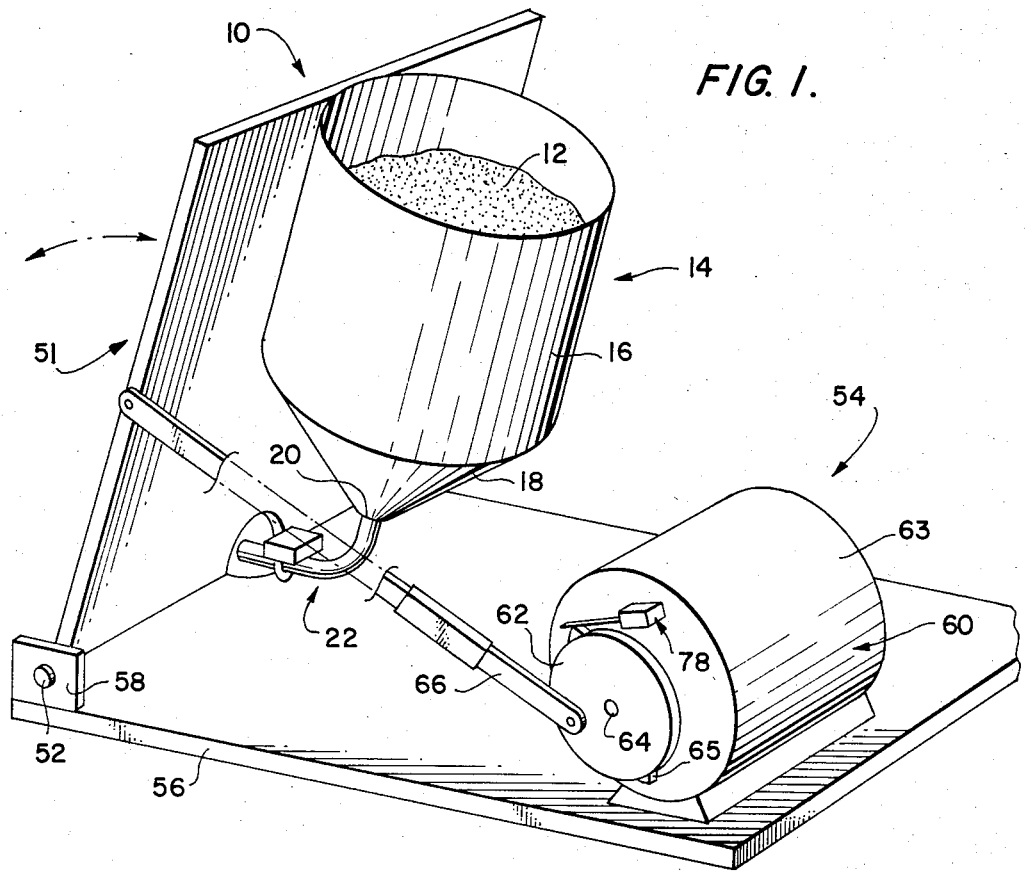
FIG. 1 illustrates an apparatus for dispensing free flowing solids in accordance with the invention.
Figure 2:
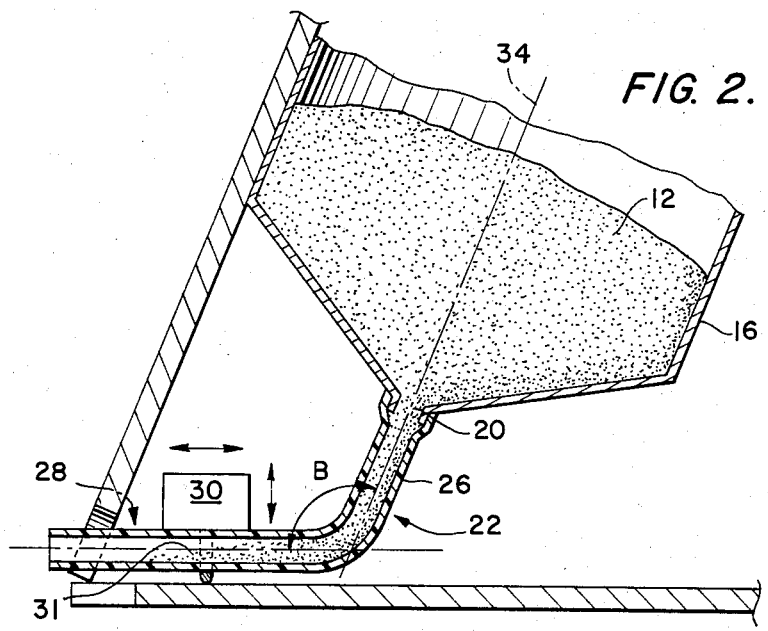
FIG. 2 illustrates a partial sectional view of the apparatus of FIG. 1 taken through the container and transporting mechanism.
Figure 1A:
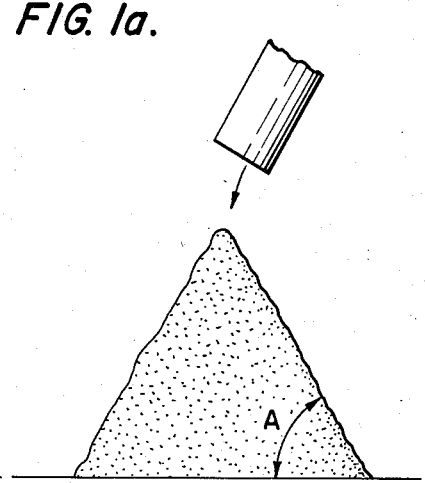
FIG. 1a illustrates the preferred method for determining if a material is free flowing.
Figure 3:
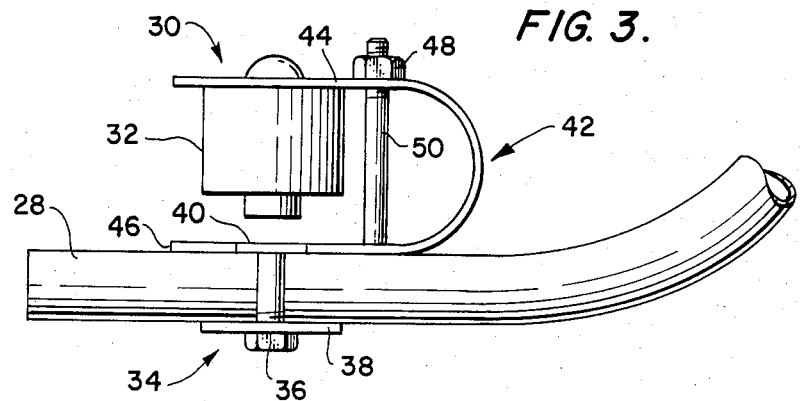
FIG. 3 illustrates the preferred form of vibrator used for agitating free flowing solids to be dispensed.

FIGS. 1 and 2 illustrate an embodiment of an apparatus 10 for dispensing free flowing solids in accordance with the invention. A free flowing solid 12 which is to be dispensed with the invention is held in a container 14 which may be of any shape or size. As illustrated in FIG. 1, the container 14 has a cylindrical section 16 which is joined to a lower conical section 18 having an opening 20 at its apex through which the free flowing solid passes. A transporting mechanism 22, is connected to the opening 20 to receive free flowing solid from the container 14 under the influence of gravity and vibrations applied to the transporting mechanism 22. The transporting mechanism 22 includes a first segment 26 which is joined to the opening 20 of the conical section 18 of the container 14 and a second segment 28 which intersect to form an angle B. Alternatively, the fluid transporting mechanism 22 may be comprised of at least a single curved section of conduit as discussed, infra, with reference to FIG. 9. The angle B can be chosen from a range of approximately 90° to 180° depending upon the flow and bridging characteristics of the free flowing solid 12 to be dispensed and the inside cross-sectional area of the transporting mechanism 22. In the preferred form of the invention, an angle B of approximately 120° has been determined to work well with the dispensing of finely granulated powders such as salt, sugar, charcoal and the like. Typically, the angle B is determined empirically to produce optimum dispensing characteristics. The angle B affects the ease with which the solids bridge and unbridge when vibrations are respectively absent and being applied and further the maximum rate of flow. Smaller angles B typically produce smaller flow rates through the transporting mechanism 22. A vibrator 30 is preferably connected to the section 28 of the transporting mechanism 22 to apply vibrations of an energy level sufficient to break up the bridging 31 which naturally forms between the particles of the free flowing solids to be dispensed when the angle of inclination of the longitudinal axis 34 is inclined at a vertical angle less than that which causes free flow of the solid 12 under the influence of gravity. The vibrator 30, which is illustrated in its preferred form in FIG. 3, is selectively activatable by a programmed controller 74 described, infra. The direction of vibration which is applied to the segment 28 of the transporting mechanism 22 may be either horizontal or vertical and should be chosen in accordance with the direction which produces the best flow characteristics. Alternatively, the vibrator may be used to apply vibrations to section 26 or to container 16.

FIG. 3 illustrates a vibrator 30 which may be used with the practice of the present invention. It should be clearly understood that the present invention is not limited to the form of the vibrator illustrated in FIG. 3. The vibrator 30 is powered by an electromagnet 32 which is activated by leads (not illustrated) which are connected to a 60-cycle alternating current supply. The vibrator 30 is connected to the segment 28 by a clamp 34 which is tightened to connect the vibrator 30 as illustrated in FIG. 3 for applying vibrations in the vertical direction or in the horizontal direction by clamping the vibrator 30 90° from the position illustrated in FIG. 3 to apply horizontal vibrations. The clamp 34 includes 2 threaded members 36, a clamping bar 38 and a tapped section 40 which receives the threads of members 36. The tapped section 40 is part of U-shaped member 42. The U-shaped member 42 may be a metallic material which is magnetically attractable. The U-shaped member 42 is sufficiently springy so that activation of the electromagnet causes the horizontal sections 44 and 46 to oscillate to apply vibratory force to the segment 28. The stroke of the vibrations produced by the vibrator 30 is adjustable by changing the axial position of nut 48 which engages a threaded member 50 through an aperture in the horizontal section 44 of the U-shaped member 42. The tightening of the nut downward causes the displacement between the horizontal sections 44 and 46 to be reduced which reduces the stroke of oscillation of the vibrator 30 as a consequence of the periodic engagement of the section 40 with the bottom of the electromagnet 32.

FIG. 1 illustrates a preferred form of mechanism for rotating the angle of inclination of the transporting mechanism 22 through an angular range to vary the flow rate of free flowing solids 12 in accordance with a flow rate relationship like that discussed in conjunction with FIG. 8, infra. The container 14 is attached to a member 51 which is pivoted around axis of rotation 52 by an angular adjustment mechanism 54. The point of attachment of the container 14 to the pivoted member 51 is remote from the pivot point 52. The pivot point 52 is attached to a base plate 56 by a pair of vertically extending members 58 (only one member being visible) in which the pivot point 52 is journaled. The angle adjusting mechanism 54 includes a motor which drives circular disc 62 rotatably mounted on the shaft 64 of the motor 63. The disc 62 has a pair of diametrically opposed projections 65 which open switch 78 to cause the stopping of the disc at one of two predetermined angular positions. The respective angular positions are used to cause the high and low flow rates of free flowing solid through the transporting mechanism 22. An arm 66 is pivotally attached at one end thereof to pivoted member 50 at a point remote from the pivot point 52 and is pivotally attached to the disc 62 at a point offset from the shaft. Rotation of the disc 62 causes the variation of the vertical inclination of the container 14 which is used to vary the flow rate of free flowing solid 12 from the high flow rate to the low flow rate and to initially set the vertical orientation (first angle) at an angle below the vertical orientation of the longitudinal axis 34 at which the powder 12 is free flowing under only the influence of gravity. At the first vertical angular orientation, the free flowing solid readily bridges when vibration is not being applied by the vibrator 30.

Figure 4:
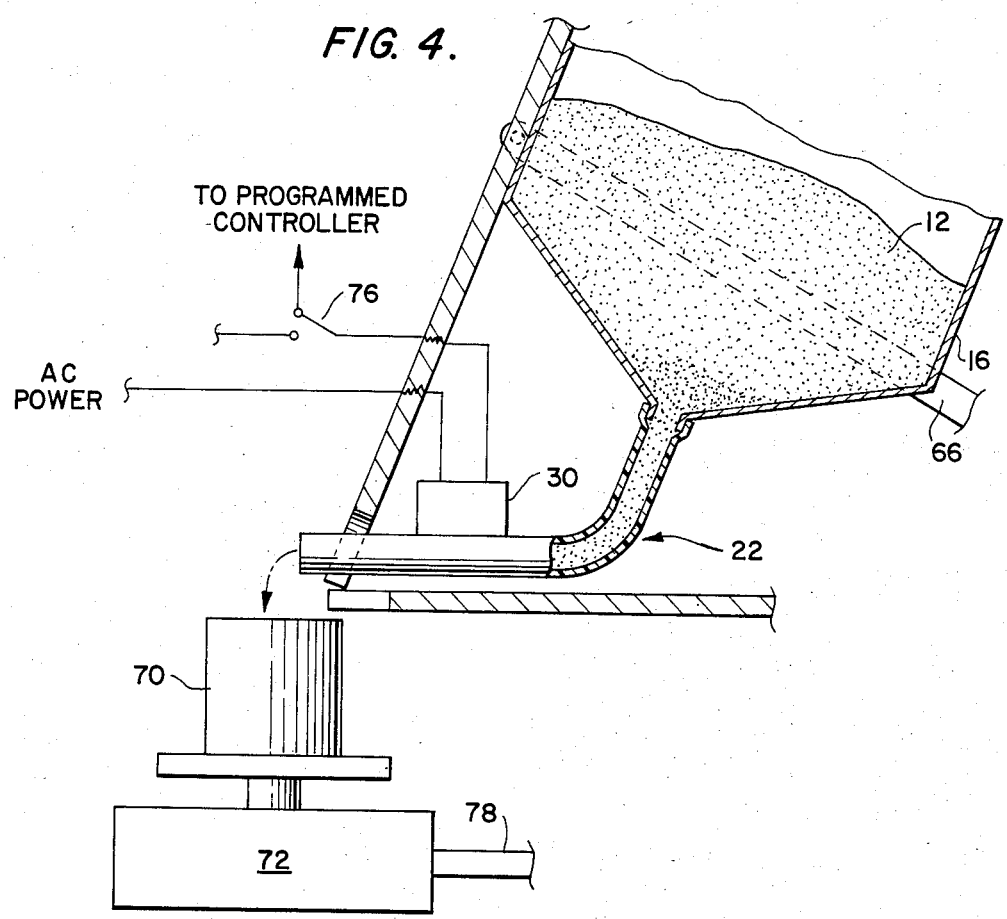
FIG. 4 illustrates an embodiment of the present invention used for dispensing a precisely metered quantity of free flowing solids.

FIG. 4 illustrates a view of the embodiment of FIG. 1 which illustrates the invention used for accurately delivering a programmed weight of a free flowing solid to a container 70. Identical reference numerals are used in FIG. 4 to identify parts common with those in FIG. 1. The angular adjustment mechanism 54 of FIG. 1 is used in this embodiment. A commercially available balance 72 having TARE capability which produces a BCD output such as a model PC 180 or PT 360 manufactured by the Mettler Instrument Corporation of Heightstown, New Jersey, is preferably used although other balances may be used which produce a BCD output of the weight of solid 12 which has been delivered to the container 70 disposed on the scale 72. The TARE capability of the balance 72 produces a zero output when the container 70 is empty when the TARE control has been activated. The vertical rotation of the transporting mechanism 22 is under the control of a programmed microprocessor 74 which is discussed in conjunction with FIG. 6. The angular adjustment mechanism 54 of FIG. 1 functions to rotate the angle of inclination of the container 14 from the first angular orientation (non-free flowing) of the longitudinal axis 34 to a second (more vertical free flowing) angular orientation of the longitudinal axis to produce the highest flow rate and thereafter to the first vertical orientation to produce a lower flow rate when the total weight TW of solid which is desired to be added to the container 70 less the actual weight in the container W is preferably less than a constant C which is less than 1. Thereafter, the switch 76 is opened to disconnect AC power from the vibrator when the actual weight W of the solid in the container 72 is equal to the programmed weight TW.

Figure 5:
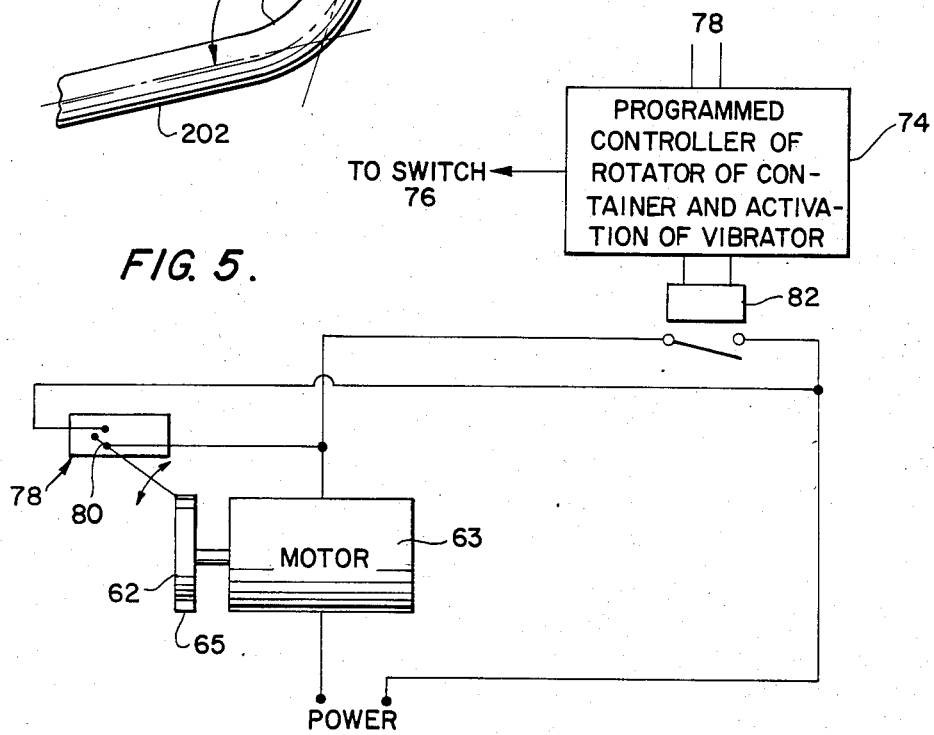
FIG. 5 illustrates an electrical schematic of the controller of the vibrator and rotator of the embodiment of FIG. 4.

FIG. 5 illustrates an electrical schematic of the programmed controller 74 as it interfaces with the motor 63 and the vibrator 30. The programmed controller 74, which is described in detail, infra, in conjunction with the flowchart of FIG. 6, controls the timed activation of the angular adjustment mechanism 54 in response to opening and closing of switch 78 to control the flow rates of free flowing solid and the activation of the vibrator 30 to control the flowing solids. The projections 65 on disc 62 cause the contact 80 of switch 78 to open circuit motor 63 from the power supply to stop the disc 62 at either of angular positions where the projections engage the contact. When the controller 74 determines that the angular position of the transporting mechanism 22 should be moved, relay 82 is caused to close momentarily. As soon as relay 82 closes, the disc 62 rotates to a position to close switch 78 and the relay 82 is caused to open. The now closed switch 78 maintains power to the motor 63 which causes the rotation of disc 62 until the other projection 65 then open circuits switch 78 thus stopping rotation of the disc to hold the angular orientation of the transporting mechanism 22 in the other angular position.

Figure 6:
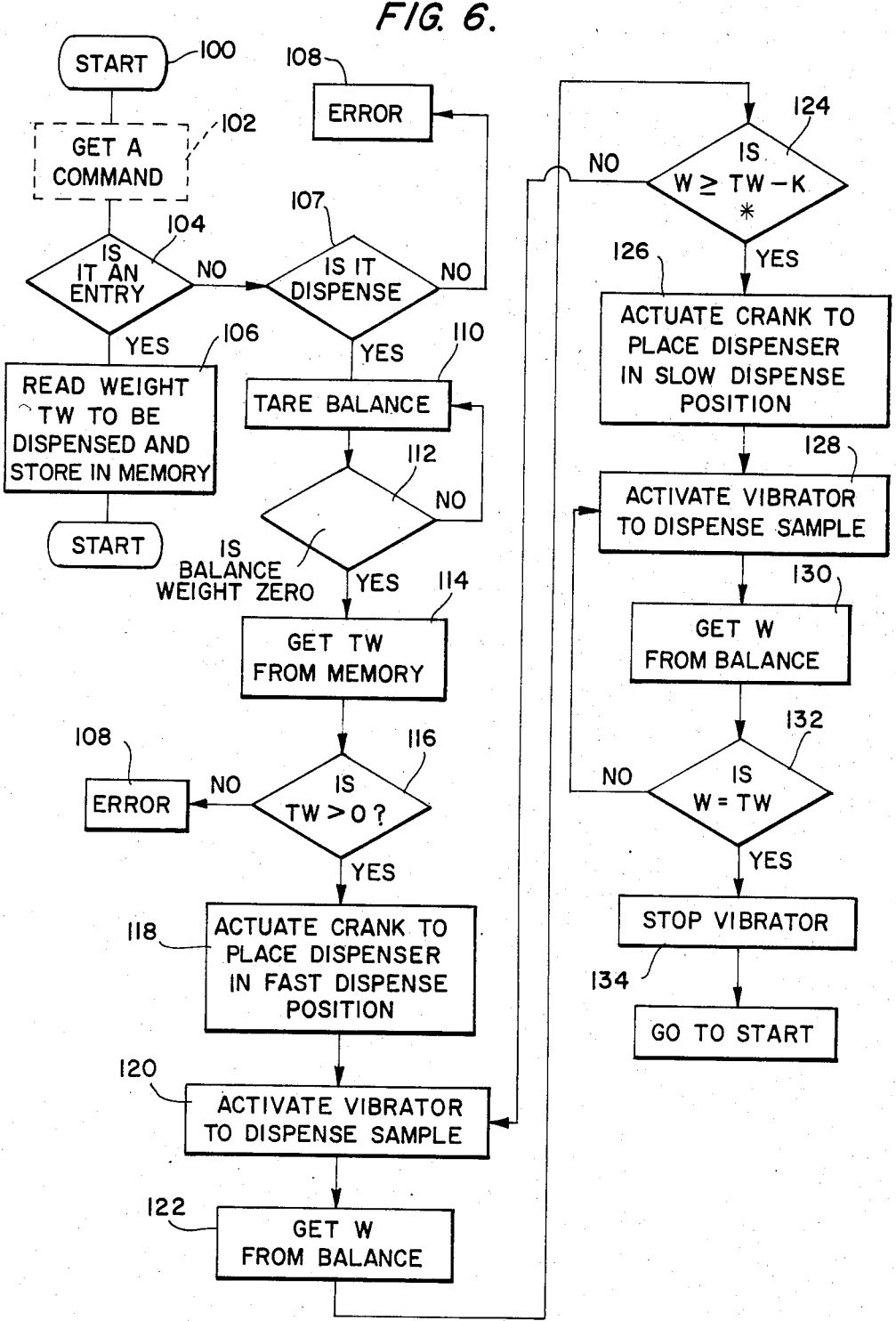
FIG. 6 is a flowchart of the control program for the programmed controller of FIG. 5.

FIG. 6 is a flowchart of the control program for the programmed controller 74 of FIGS. 4 and 5 for controlling the programmed delivery of a precisely metered weight TW of a free flowing solid to be dispensed to container 70. The program of the flowchart of FIG. 6 may be programmed in any commercially available microprocessor. The program proceeds from starting point 100 to point 102 where a command is obtained which is either an entry command or dispense command described, infra. The program proceeds from point 102 to decision point 104 where a determination is made if the command is an entry command. If an entry command is detected, the program proceeds to point 106 where the weight TW of free flowing powder to be dispensed is read and stored in memory. The program proceeds from point 106 back to start point 100. If the answer is "no" at decision point 104, the program branches to decision point 107 where a determination is made if the command was a dispense command. If the answer is "no" at decision point 107, the program branches to error point 108 where the program stops and indicates an error condition. If the answer is "yes" at decision point 107, the program branches to point 110 where the TARE control on balance 72 is activated. The program proceeds from TARE point 110 to decision point 112 where a determination is made if the balance BCD output is at 0. If the answer is "no", the program branches back to TARE point 110 to complete the activation of the TARE function on balance 70. If the answer is "yes" at decision point 112, the program branches to decision point 114 where the previously read quantity TW of free flowing solid to be dispensed is read from memory. The program proceeds from point 114 to decision point 116 where a determination is made if the weight of the free flowing solid to be dispensed TW is greater than 0. If the answer is "no" at decision point 116, the program branches to error point 108 where the processing is stopped to indicate an error condition. If the answer is "yes" at decision point 116, the program proceeds to point 118 where the angle adjusting mechanism 54 is activated to rotate the transporting mechanism 22 from the first non-flowing vertical angular orientation to the second fast dispense vertical angular orientation. As described above in conjunction with FIGS. 1 and 5, the disc 62 is rotated to a position where projection 65 causes the open circuiting of switch 78 to hold the container 14 in its most vertical orientation. The program proceeds from point 118 to point 120 where the vibrator 30 is activated to cause the bridge 31 which is formed in the angle B of the transporting mechanism 22 of FIG. 2 to be broken apart to permit free flowing of the free flowing solid 12 to be dispensed. The program proceeds from point 120 to point 122 where the BCD output W from balance 70 is read. The program proceeds from point 122 to decision point 124 were a determination is made if the quantity W which has been read at point 122 is equal to or greater than the quantity TW which was read at point 106 minus a constant K which is a predetermined number less than 1. If the answer is "no" at decision point 124, the program branches back to point 120 to reenter the activation of the vibrator 30 to continue the dispensing of the free flowing solid to be dispensed. If the answer is "yes" at decision point 124, the program branches to point 126 to rotate the transporting mechanism 22 to the second angular vertical position which is less inclined than the fast dispense position to which rotation occurred at point 118. With reference to FIG. 5, the relay 82 is momentarily closed at point 126 to cause the switch 78 to close after the disc 62 rotates to a position where projection 65 is not holding the switch element 80 in an open position. Thereafter, the disc 62 continues to rotate to a position where the switch element again is opened to cause stopping of the disc 62 at the slow dispense vertical angular orientation of the transporting mechanism 22. The program proceeds from point 126 to point 128 where the activation of the vibrator 30 is continued by causing the closure of switch 76 of FIG. 4. The program proceeds from point 128 to point 130 where the weight W of free flowing solid contained in container 70 of FIG. 4 is read in BCD format. The program proceeds from point 130 to decision point 132 where a determination is made if the weight W read at point 130 is equal to the weight of free flowing solid to be dispensed TW which was read at point 106. If the answer is "no", the program branches back to point 128 to continue activation of the vibrator 30 to continue the dispensing of the free flowing solid. If the answer is "yes" at decision point 132, the program branches to point 134 where the activation of the vibrator 30 is stopped. The program proceeds from point 134 to point 100 to be placed in a condition for another reading and/or dispense cycle.

Figure 7:
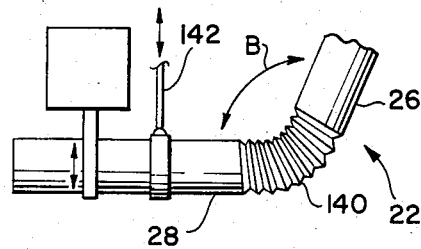
FIG. 7 illustrates an alternative transporting mechanism of the embodiment of FIG. 1.

FIG. 7 illustrates an alternative embodiment of the transporting mechanism 22 which has a flexible coupling 140 that joins together straight segments 26 and 28. While the preferred embodiment of the invention changes flow rate by rotation of the vertical inclination of the transporting mechanism 22 by vertical rotation of the container 14, alternatively the angle B may be varied. This embodiment is based upon the principle that bridging 31 of the free flowing solid is a function of the angle B such that the greater the angle B the less likely bridging is to occur. With this embodiment, the angle B for slow dispensing is chosen empirically for the solid to be dispensed such that bridging 31 occurs when vibrations from vibrator 30 are not applied but does not occur when vibrations are applied. The angle B for fast dispensing, which is greater than the angle B for slow dispensing, is chosen for a desired fast dispensing rate. The angle B is varied by an actuator 142 for varying the angular position of segment 28 with respect to segment 26. The vertical position of actuator 142 may be varied by the rotation of the disc 62 with an eccentric attachment of the actuator thereto in a manner similar to arm 66 in FIG. 1.

FIG. 8 illustrates the flow rate of activated charcoal in grams per minute when a conduit of diameter $\frac{1}{4}''$ is used in the apparatus of FIG. 1 as a function of the angle segment 28 with respect to the horizontal for a fixed angle B of 120 degrees. A positive angle of inclination of the segment 28 of the transporting mechanism 22 is illustrated in the top right-hand portion of FIG. 8. A neutral angle of inclination of the segment 28 of the transporting mechanism 22 of 0° is represented by the middle portion of the right hand part of FIG. 8. A negative angle of inclination of the segment 28 of the transporting mechanism 22 is illustrated by the bottom right hand portion of FIG. 6.

A significant aspect of the present invention is a linear relationship between flow rate and the angle of inclination for angles from the neutral to the positive. The data points illustrated in the range from 0°–30° were derived by the dispensing of powdered charcoal under the conditions as described above. The linear relationship between flow rate and angle of inclination facilitates the precise metering of flow rate which is desirable for precision applications such as those encountered in the laboratory. Given the aforementioned linear flow characteristic, particular dispensing cycles which require rapid dispensing but an accurate final dispensed weight TW may be designed by correlating the desired fast and slow flow rates with the desired flow rates on the ordinate.

The flow rate for negative angles of inclination drops off in a non-linear fashion. The flow rate at negative angles just below the neutral drops off rapidly as a function of angle. As the negative angle of inclination increases, the slope of the flow rate becomes less. Very small rates of flow rate can be produced by the choice of a desired negative angle if the positive angles described, supra, have flow rates which are too great for the desired flow rate.

Flow characteristics of different powders will influence the rate of change of flow as a function of angle as illustrated in FIG. 8. However, in accordance with the invention, a particular free flowing solid to be dispensed may be empirically tested to determine its flow characteristics so that optimization of flow characteristics for desired applications may be accomplished. Factors which should be considered in optimizing the usage of the invention are the amount of material to be dispensed, the dispensing rate and the dispensing time. A useful starting point in optimizing the system is to set the angular orientation of the longitudinal axis 34 such that the segment 28 of the transporting mechanism 22 is parallel to the horizontal for an angle B of approximately 120°. Typically, in this orientation, a powder will not be free flowing without the application of vibratory force applied to the transporting mechanism 22 of the vibrator 30. Additionally, the adjustment of the stroke of the vibrator with the adjustment apparatus of FIG. 3 may be varied to determine the amount of energy necessary to dissipate the bridge 31 in the transporting mechanism 22 to cause free flow of the powder to be dispensed. Additionally, the angle of inclination of the longitudinal axis 34 may be increased towards the vertical to provide additional gravitation energy for breaking the bridge 31 without the adjustment of the stroke of the vibrator 32 to a larger oscillation. Finally, the size of the angle B in the transporting mechanism 22 may be varied to determine the angle which produces optimum flow conditions. It is believed that an angle B of approximately 120° is especially well suited for the dispensing of various types of powders, but the invention may be practiced with the angle B being chosen to be greater than 90°, but less than 180° if the flow chracteristics of the free flowing solid 12 permit. In general, the finer the particle size, the smaller the angle B necessary to produce free flowing of the solid through the transporting mechanism 22.

Figure 9:
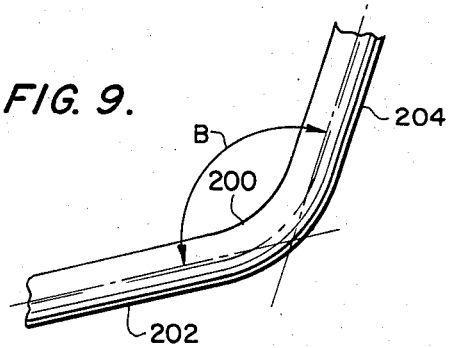
FIG. 9 illustrates another alternative of the transporting mechanism of FIG. 1.

FIG. 9 illustrates another embodiment of the transporting mechanism which has a more gradual curved section 200 than that illustrated in FIGS. 1 and 7 which functions to form a bridge of free flowing solids in the absence of vibrations. The angle B formed by the curved section may be measured by determining the angle subtended by the centerlines of the straight sections 202 and 204. Like the embodiments described, supra, the angle B should be between 90° and 180°.

While the preferred form of the invention is most useful in laboratory applications, it should be understood that the invention is not limited to small scale applications. The invention may be practiced by the appropriate scaling up of the container 14 and the transporting mechanism 22 without limitation to the particular form as illustrated. Moreover, the invention is not limited to the form of the transporting mechanism 22 as illustrated.

While the invention has been described in terms of its preferred embodiment, it should be clearly understood that modifications may be made to the invention without departing from its scope as defined in the appended claims.

What I claim as my invention is:

1. An apparatus for dispensing free flowing solids comprising:
    (a) a container for holding a free flowing solid to be dispensed;
    (b) a transporting means including a passage defined by a continuous closed surface for transporting particles of the free flowing solid through the passage, the transporting means having an inlet connected to the container and a discharge end located remote from the container, the passage having segments defining a transport angle having an apex greater than 90° but less than 180°, the transport angle causing the particles disposed within the passage to form a bridge within the passage which functions to stop the flow through the passage under the influence of gravity when the transporting means is inclined at a vertical angle of inclination less than a vertical angle of inclination at which gravity causes free flow of particles through the passage;
    (c) means for selectively applying vibrations to the particles within the passage with an energy sufficient to cause the bridge to break apart to cause the particles to be free flowing from the container;
    (d) means for varying the vertical angle of inclination of at least part of the transporting means with respect to a vertical reference to cause variation in the rate of flow of the particles through the passage as a function of the vertical angle of inclination during the application of vibrations to the particles; and
    (e) the rate of flow of the particles through the passage being a linear function of the vertical inclination of the segment of the passage between the discharge end and the apex of the transport angle when the discharge end is inclined with a downward slope from the apex of the transport angle to the discharge end.

2. An apparatus for dispensing free flowing solids in accordance with claim 1 wherein the means for varying the vertical angle of inclination of at least part of the transporting means comprises:
    means for pivoting the container through a vertical angular range of inclination to cause the variation of the vertical angle of inclination of the transporting means.

3. An apparatus for dispensing free flowing solids in accordance with claim 1 wherein the means for varying the vertical angle of inclination of at least part of the transporting means comprises:

means for varying the transport angle between the segments by angular movement of one of the segments with respect to the other.

4. An apparatus for dispensing free flowing solids in accordance with claim 3 wherein the means for varying the transport angle causes angular movement of the segment closest to the discharge end.

5. An apparatus for dispensing free flowing solids in accordance with claim 4 wherein the means for selectively applying vibrations is connected to the segment closest to the discharge end.

6. An apparatus for dispensing free flowing solids in accordance with claim 2 wherein:

the passage segments are joined together by a flexible coupling connecting the segments together to form the transport angle.

7. An apparatus for dispensing free flowing solids in accordance with claim 1 wherein the passage comprises a curved section which defines said transport angle.

8. An apparatus for dispensing free flowing solids in accordance with claim 6 wherein the means for selectively applying vibrations is connected to the segment closest to the discharge end.

9. An apparatus for dispensing free flowing solids in accordance with claim 8 wherein the transporting means is a conduit.

10. An apparatus for dispensing free flowing solids in accordance with claim 9 wherein the means for selectively applying vibrations has a stroke of oscillation and further includes means for adjusting the stroke of oscillation to vary the energy level applied to the particles.

11. An apparatus for dispensing free flowing solids in accordance with claim 10 wherein the rate of flow of the particles through the passage is a non-linear function of the vertical angle of inclination of the segment having the discharge end when the segment having the discharge end is inclined with a downward slope from the discharge end to the apex of the transport angle.

12. An apparatus for dispensing free flowing solids in accordance wiht claim 1 wherein the transport angle is approximately 120°.

13. An apparatus for dispensing free flowing solids in accordance with claim 11 further comprising:

at a pivot point, which is connected to the container at a point remote from the pivot point;

(b) a base to which said pivoted member is attached at the pivot point;

(c) a rotatable member mounted on the base with an axis of rotation parallel to the axis of rotation of the member; and (d) an arm rotatably connected to the pivoted member at a point remote from the pivot point of the pivoted member and to the rotatable member at a point remote from the axis of rotation of the rotatable member whereby rotation of the rotatable member causes pivoting of the container through the vertical angle of inclination to vary the flow rate of the particles when said means for applying vibrations is operating.

14. An apparatus for dispensing free flowing solids in accordance with claim 1 further comprising:

(a) a balance for repeatedly reading the weight W of any solid within a container disposed on the balance, the container being positioned for receiving the particles exiting from the discharge end of the transporting means; and (b) programmed control means for the activation of the means for selectively applying vibrations and for varying the vertical angle of inclination of at least part of the transporting means measured with respect to the vertical, the control means causing the activation of the means for selectively applying vibrations as long as TW-W is <0 where TW is a desired weight of the free flowing solid to be dispensed which is inputted by an input unit and for causing the programmed control means to vary the vertical angle of inclination of at least part of the transporting means from a second vertical angular orientation to a first vertical angular orientation in which the first orientation is closer to the horizontal when TW-W is less than C wherein C is a constant less than TW and for causing the rotation of at least part of the transporting means to the second vertical angular orientation from the time of activation of the means for selectively applying vibrations unitl TW-W equals C.

15. An apparatus for dispensing free flowing solids in accordance with claim 14 wherein the programmed control means varies the vertical angle of inclination of at least one part of the transporting means by varying the vertical angle of inclination of the container.

16. An apparatus for dispensing free flowing solids in accordance with claim 14 wherein the programmed control means varies the vertical angle of inclination of at least part of the transporting means by moving one segment of a pair of segments which define the transport angle.

17. An apparatus for dispensing free flowing solids comprising:

(a) a container for holding free flowing solid to be dispensed;

(b) a transporting means including a passage defined by a continuous closed surface for transporting particles of the free flowing solid through the passage, the transporting means having an inlet connected to the container and a discharge end located remote from the container, the passage having segments defining a transport angle having an apex greater than 90° but less than 180°, the transport angle causing the particles disposed within the passage to form a bridge within the passage which functions to stop the flow through the passage under the influence of gravity when the transporting means is inclined at a vertical angle of inclination less than a vertical angle of inclination at which gravity causes free flow of particles through the passage;

(c) means for selectively applying vibrations to the particles within the passage with an energy sufficient to cause the bridge to break apart to cause the particles to be free flowing from the container; and (d) the rate of flow of the particles through the passage being a linear function of the vertical angle of inclination of a segment of the passage between the discharge end and the apex of the transport angle when the discharge end is inclined with a downward slope from the apex of the transport angle to the discharge end.

18. An apparatus for dispensing free flowing solids in accordance with claim 17 wherein the passage segments are joined together by a coupling.

19. An apparatus for dispensing free flowing solids in accordance with claim 18 wherein said coupling is curved.

20. An apparatus for dispensing free flowing solids in accordance with claim 17 wherein the transporting means comprises a curved section of conduit which is coupled to said container, the curved section defining said transport angle by the intersection of centerlines passing through said container and the discharge end.

21. An apparatus for dispensing free flowing solids comprisiing:
(a) a container for holding a free flowing solids to be dispensed;
(b) a transporting means including a passage defined by a continuous closed surface for transporting particles of the free flowing solid through the passage, the transporting means having an inlet connected to the container and a discharge end located remote from the container, the passage having a pair of intersecting segments defining a transport angle having an apex greater than 90° but less than 180°, the transport angle causing the particles disposed within the passage to form a bridge within the passage which functions to stop the flow through the passage under the influence of gravity when the transporting means is inclined at a vertical angle of inclination less than an angle at which gravity causes free flow of the particles through the passage;
(c) means for selectively applying vibrations to the transporting means at a point between the discharge end and the transport angle to cause the bridge to break apart to cause the particles to be free flowing from the container in response to the application of the vibrations;
(d) means for varying the vertical angle of inclination of at least part of the transporting means with respect to a vertical reference to cause variation in the rate of flow of the particles through the passage as a function of vertical angle of inclination during the application of vibrations to the particles; and
(e) the rate of flow of the particles through the passage being a linear function of the vertical angle of inclination of a segment of the passage between the discharge end and the apex of the transport angle when the discharge end is inclined with a downward slope from the apex of the transport angle to the discharge end.

* * * * *